United States Patent [19]
Williams

[11] 3,911,432
[45] Oct. 7, 1975

[54] TECHNIQUE FOR ELIMINATING MUTUAL INTERFERENCE BETWEEN ADJACENT ASYNCHRONOUS RADAR SYSTEMS

[75] Inventor: James K. Williams, Fullerton, Calif.

[73] Assignee: The United States of America as represented by the Secretary of the Navy, Washington, D.C.

[22] Filed: Apr. 17, 1974

[21] Appl. No.: 461,574

[52] U.S. Cl.............. 343/5 R; 343/7.5; 343/17.1 R
[51] Int. Cl.² .......................................... G10S 9/02
[58] Field of Search .............. 343/5 R, 7.5, 17.1 PF

[56] References Cited
UNITED STATES PATENTS

| | | | |
|---|---|---|---|
| 2,972,141 | 2/1961 | Barlow et al. | 343/5 R |
| 3,222,672 | 12/1965 | Forestier | 343/7.5 |
| 3,378,835 | 4/1968 | Mooney, Jr. et al. | 343/5 R |
| 3,821,751 | 6/1974 | Loos | 343/5 R |

Primary Examiner—T. H. Tubbesing
Attorney, Agent, or Firm—R. S. Sciascia; P. Schneider; W. T. Ellis

[57] ABSTRACT

A method for eliminating mutual interference between two adjacent radar systems without the use of transmission pulse synchronization wherein a. if the radar systems are in a search mode and their operating frequencies are close enough to cause interference, then the receivers are blanked;

b. if the systems are using range-gate modes (tracking) and there is an overlap of one system's transmission with another system's range-gate, then time delays are inserted in the transmission and range-gate tables of the systems to eliminate this overlap, i. the time delays may be inserted so as to interwine the transmissions and range-gates of the systems, or ii. the time delays may be inserted so as to shift the interfering transmissions completely past the last range-gate of the interfered-with system.

4 Claims, 8 Drawing Figures

TECHNIQUE FOR ELIMINATING MUTUAL INTERFERENCE BETWEEN ADJACENT ASYNCHRONOUS RADAR SYSTEMS

FIELD OF INVENTION

This invention relates generally to radar systems and in particular to multiple doppler radar systems.

PRIOR ART

In certain phased array radar installations the total surveillance area is divided between two or more radar systems. These multiple radar systems operate in close proximity to each other and thus generate mutual interference. If one system transmits an energy pulse during the receiver live time of an adjacent system, the adjacent system will be temporarily blinded by the interfering transmission. In an automated radar system (tracking-mode) the receiver live-time which is used for automatic processing is specified by range-gates. Interference occurring within a receiver automatic-processing range-gate will cause false target reports to be sent to the computer. Interference occurring during the receiver live time of a horizon scan or search beam will cause large bright spots on the display presentation.

To meet this problem, present and previous multiple radar systems have been totally synchronized so that the transmissions of the adjacent radars occur simultaneously. The time between transmission pulses (inter-pulse-period) in a modern radar system varies on a beam-to-beam basis as a function of the range and radial velocity of the targets which are being observed. The inter-pulse-period must be varied for each different target that is observed in order to keep the target video from being lost in the blind ranges and velocities of the clutter rejection.

If two adjacent radars are forced by synchronization requirements to use identical inter-pulse-periods, the overall system must pay a heavy penalty in efficiency and clutter rejection performance.

Since most radars use a doppler type system in which a string of pulses are sent out at each transmission command, this interference problem can become quite acute.

SUMMARY OF INVENTION

Briefly, in order to avoid mutual interference between two or more radar systems whose frequencies of transmission are in close proximity, a method has been devised wherein, if the systems are in a scanning mode, then all the systems are blanked during a transmission by either system, and if the systems are in a tracking mode, time delays are inserted in the transmission timing tables such that the transmissions and range-gates of one system do not cause interference with the transmissions and the range-gates of the other systems.

OBJECTS OF THE INVENTION

An object of the present invention is to prevent mutual interference in a multiple radar system.

A further object of the present invention is to prevent bright spots due to interference, in the radar-display presentation in a search-beam mode or in a tracking mode.

A still further object is to remove present-day synchronization requirements in multiple radar systems thus permitting good clutter rejection performance and high efficiency.

DETAILED DESCRIPTION OF THE INVENTION

The present system provides blanking at all the receivers during a transmission from any transmitter in the horizon scan mode or search beam mode if the operating frequencies of the systems involved are close enough to cause interference.

If the operating frequencies of the systems are far enough apart there will be no interference and thus a receiver will be blanked only when its own transmitter is transmitting.

When a particular target is being tracked and thus a range-gate mode is being used, no blanking is applied since the receivers of the systems will not be effected by any transmission that does not occur during a range-gate. But there may be interference if the transmission of one system overlaps the range-gates of the other system, provided that their transmission frequencies are again close enough to cause interference. The solution to this problem is to insert time delays in the transmission and range-gate times of one of the systems to prevent the overlap.

Thus in one embodiment time delays are inserted in the system transmission and range-gate patterns to intertwine the range-gates and transmissions of the systems so that there is no overlap.

In another embodiment, when range-gates are used, and an interference is detected between a range-gate and a transmission, a time delay is inserted to shift in time the beginning of a set of interfering transmissions completely past the last range-gate of the interfered-with system.

In order to provide receiver blanking during transmit time in a horizan scan and to insert time delays at the proper time in a range-gate mode to avoid mutual interference, the basic mutiple radar system must have a number of capabilities or be modified to have these capabilities. Assuming a two radar system by way of example, the following capabilities are required:

a. Capability to slave both digital processors to the same clock reference.

b. Capability to send, receive and process synchronization and blanking commands between the two systems.

c. Capability to insert a specified time delay into radar dead-time.

d. Capability in each digital processor to receive a time delay word from the system computer.

e. An additional inter-computer I/O channel.

Figure 1:
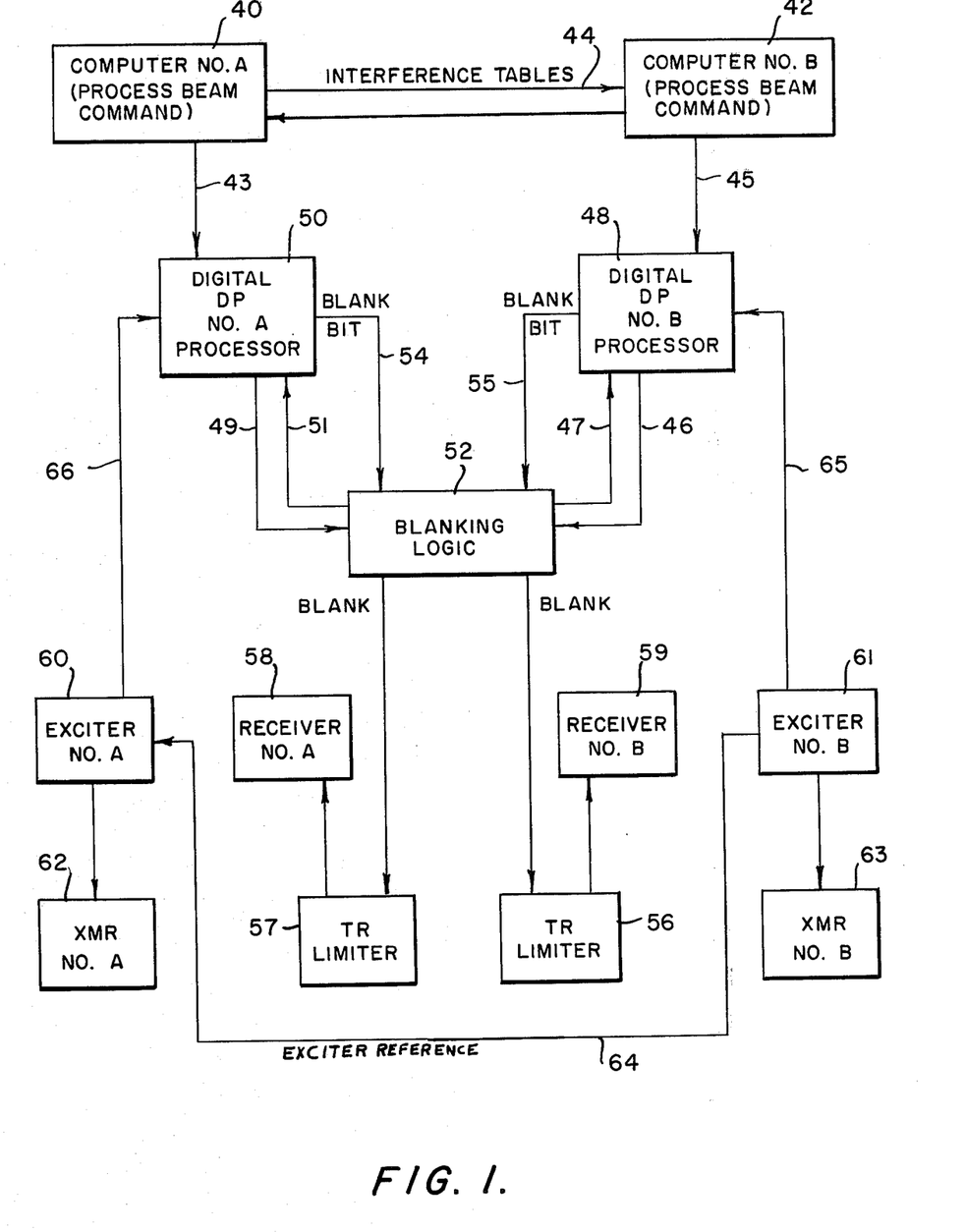
FIG. 1 is a block diagram of one embodiment of the present invention.

FIG. 1 is a set of modifications in block diagram form that could be used on an existing radar system to implement this interference elimination technique.

Each of the radar systems A and B originally comprised a computer to process beam commands 40 and 42, a digital processor 48 and 50, a receiver system 58 and 59, a transmitter system 60, 62 and 61, 63, and a limiter 56 and 57 to blank the receiver at its own transmit time.

In order to provide proper timing for blanking and insertion of time delays both computers are required to monitor the transmit and receive times of both systems. Therefore, the timing relationships between the two systems must be predictable. This requirement dictates that both digital processors be slaved to the same master clock.

The exciters 60 and 61 of the original system are merely oscillators which provide the transmitter carrier frequency. This master-slave clock requirement is accomplished by driving both digital processors off the same exciter. In the present embodiment the exciter 61 drives the processor 48 via the line 65 and the other exciter oscillator 60 via the line 64. Thus the digital processor 50 driven by exciter 60 is essentially being driven by exciter 61.

In order for the timing relationships between the two systems to be computed properly, there is also a requirement that both system processors be synchronized to some reference.

This is accomplished by sending synchronization signals from each computer to the synchronization logic 52 which then generates a pulse to start the two processors at the same time.

This synchronization is accomplished as follows: Once each second the two systems are synchronized. The system A computer 40 is designated as the master computer. It can be modified in any number of ways to generate a synchronized bit periodically. In the present embodiment, a clock is used to count out a timing register. When the timing register reaches the desired count, it generates a signal and then automatically resets to count the next period. When the system A computer senses this signal it resets its beam times in its pulse transmission timing table to 0 and generates a synchronization bit and sets the transmission time T-on in the timing table equal to a negative number.

The generated synchronization bit is sent to the system A digital processor 50 on line 43. Upon receiving this synchronization bit, the processor will simultaneously stop its dead-time counter and relay the synchronization bit to the synchronization logic of block 52 via the line 49.

After the T-on has been set to a negative number, all further calculations are by-passed by the computer and the interference table for system A is transferred with this negative T-on to the system B computer 42 via the line 44. Computer 42 will sense this negative number T-on, realize that this is a sync command, set its sync bit, and reset all the beam times in its pulse transmission timing table to 0.

This sync bit generated by computer 42 will also be sent to its digital processor 48 via the line 46. This digital processor will then stop its dead-time counter and relay the sync bit to the synchronization logic of block 52.

Figure 2A:
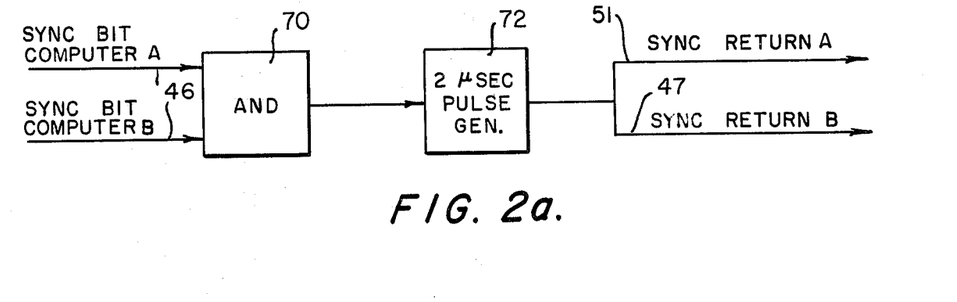
FIG. 2a is a block diagram of the sync logic of block 52.

The internal synchronization logic of block 52 is shown in FIG. 2a. When the AND gate 70 has received both computer sync bits, it applies a signal to the 2 $\mu$sec pulse generator 72 which then generates a sync return pulse. This sync return pulse is applied back to the two processors 48 and 50 on lines 47 and 51 respectively and acts to restart the processors. Thus both processors have restarted at the same time. Using this time as a reference both computers will then be able to predict subsequent timing relationships between the transmitters and receivers of the two radars.

Figure 3:
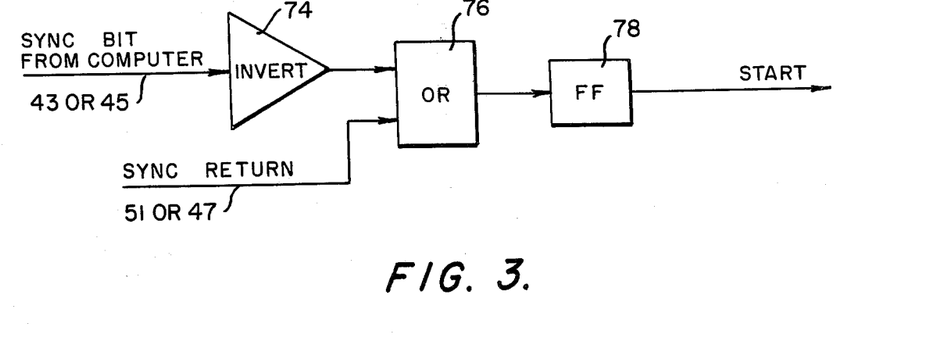
FIG. 3 is a block diagram of the required modification to the digital processor of each system.

The SPS-33 Processor made by Hughes Aircraft Company may be modified and used in the present system. A possible modification of the SPS-33 digital processor to accomplish a stoppage of all processing upon the reception of a sync bit from lines 43 and 45 and a restarting of processing upon the reception of a sync return signal via lines 51 and 47 is shown in FIG. 3. When the flipflop 78 is in set the processor is running, and when it is in reset the processor is stopped. The sync the line 43 or bit from 45 comes into inverter 74. The inverter 74 inverts the high voltage (1) value of the sync bit and applies this signal to an OR gate 76. The OR 76 then applies a low voltage value (0) to the flipflop 78 which then goes to reset (assuming the processor is running initially) stopping the processor.

When a sync return signal is generated from the synchronization logic of block 52 and sent via the lines 51 and 47 back 47 to the processors 50 and 48 respectively, it is applied to the OR gate 76. The OR gate 76 then sends a high voltage (1) signal to the flipflop 78 which then goes to set and restarts the processor.

In order to prevent the display of transmission interference on a PPI console in a search mode, each receiver is blanked during its own transmission times and certain conditions during the other systems' transmission times. The certain conditions mentioned above for blanking a receiver during the other systems' transmission time are that the operating frequencies of the two radars be close enough together to cause interference. The frequency comparison of these operating frequencies is performed in the system computers and is to be discussed in the computer-program flowchart explanation.

When either of the computers 40 or 42 determines that a beam might cause interference on the PPI it sets a blanking bit in a time delay word set and applies it via either line 43 or 45 to its respective digital processor. The processor for that computer then notes the time of the coming radar beam transmission and at the appropriate time it applies the blanking bit on line 54 to the blanking logic of block 52. This process for determining the time at which the blanking bit is to be inserted into the receiver is well-known in the processor art and will not be discussed here.

Figure 2B:
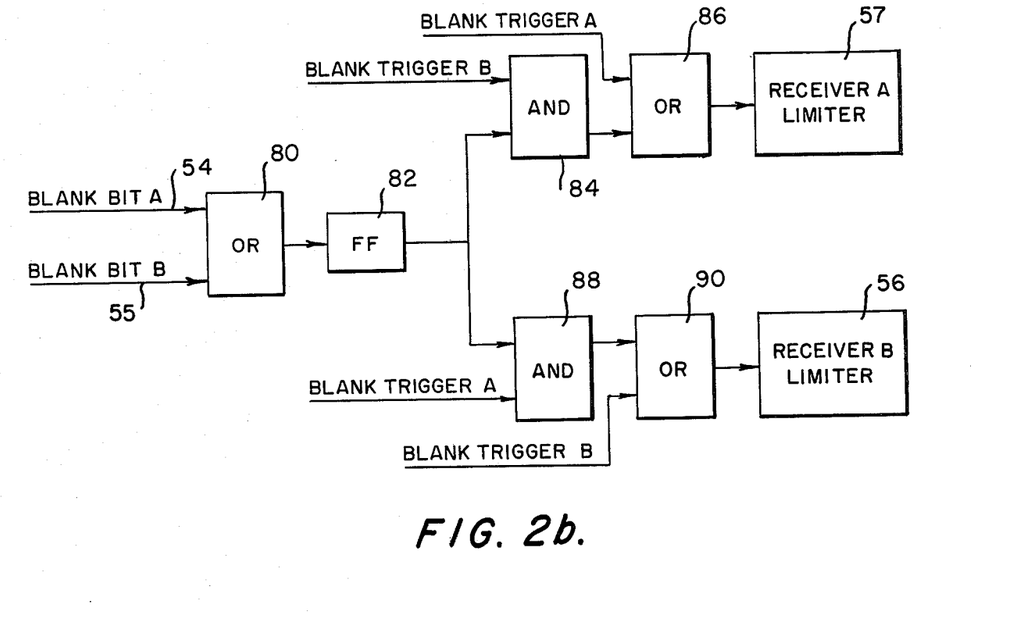
FIG. 2b is a block diagram of the blanking logic of block 52.

The blanking logic of block 52 is shown in FIG. 2b. When either of computers 40 or 42 have determined that a transmission will cause interference at the other systems' PPI and has sent a blanking bit to the blanking logic of block 52 by way of its digital processor, the OR gate 80 applies a signal to flipflop 82. The flipflop 82 then goes to set. As can be seen from the logic circuitry, when the flipflop 82 is set, both receivers will be blanked.

For example, assume a blanking bit has been generated in computer 42 and sent to block 52 via line 55. As is well known, which-ever system is planning to send a transmission will generate and apply a blank trigger (bit) to its own receiver to prevent interference. (An inherent function of a digital processor). Thus if system B is planning a transmission, a blank trigger B will normally be sent to receiver B (59). The present system is modified to apply this signal instead to the blanking logic of block 52. Thus when flipflop 82 is set and there is a blank trigger from system B for its own receiver, the AND gate 84 generates a signal and applies it to the OR gate 86 which in turn applies a signal to energize the limiter for system A, block 57. The OR gate 90 also generates a signal due to its blank trigger B input and thus the system B limiter block 56, is also energized. As can be seen by working through the logic, when a blank trigger for system A occurs in conjunction with the flipflop 82 being in set, then AND gate 88 generates a signal which energizes the OR gate 90 which in turn energizes the receiver B limiter 56 and simultaneously the OR gate 86 is energized thus energizing the system limiter 57.

When a computer is in a tracking mode, and the operating frequencies of the systems are close enough to cause interference, and if it is determined that a beam that it is preparing will cause interference in the other system or will be interfered with by the other system, the computer calculates a time delay for the beam. This time delay is calculated so as to eliminate any overlap between the transmit pulses and receiver gates of the two systems. This time delay is then sent to the system digital processor in the first word of the beam control words normally sent by the computer via lines 43 or 45. This word is always sent even when the time delay is zero. At some point in the radar dead-time the digital processor then stops its dead-time counter by the exact amount specified in the time delay word.

Two different programmed embodiments were used to determine the delays needed to prevent overlap. One program can be used with a small inexpensive computer while the other program requires a fast computer.

Figure 4:
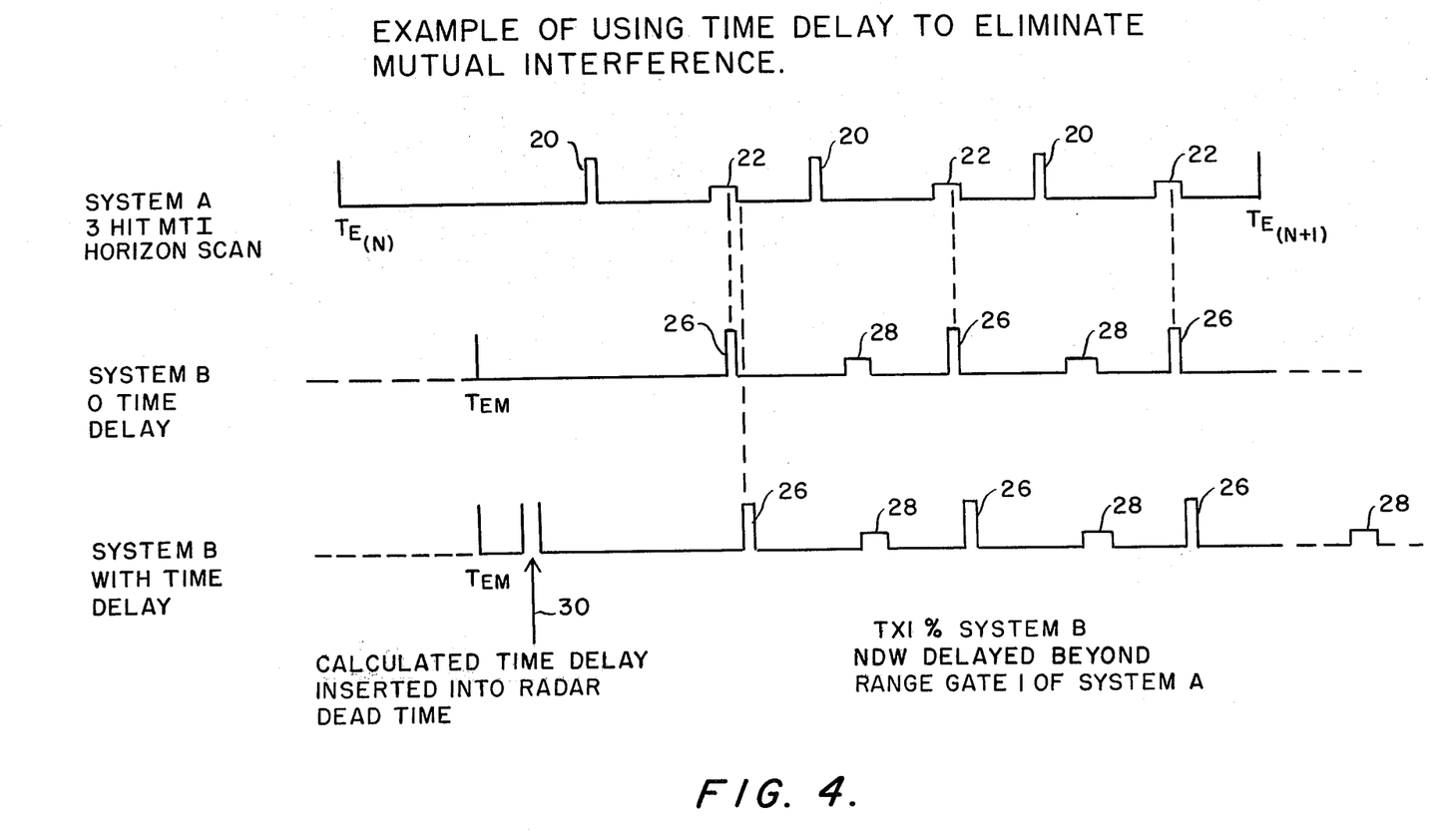
FIG. 4 is a timing diagram for the programmed embodiment illustrated in FIG. 5.

FIG. 4 is a timing diagram illustrating the time delay technique used in one embodiment to keep mutual interference outside of the automatic processing range-gates. System A is a three-hit MTI. The pulses 20 represent the radar pulses and the squat pulses 22 represent their respective range-gates.

System B represents a second three-hit MTI system with no time delay. The pulses 26 represent the radar pulses and the squat pulses 28, their respective range-gates. The 3 pulses 26 of system B will obviously cause interference in the range-gates of system A.

The third set of pulses represents system B with a time delay sufficient to shift in time the system B series of pulses such that the interfering pulse will occur after the interfered-with range-gate. The 30 is the time delay inserted in system B to shift the transmit times for system B.

Figure 5A:
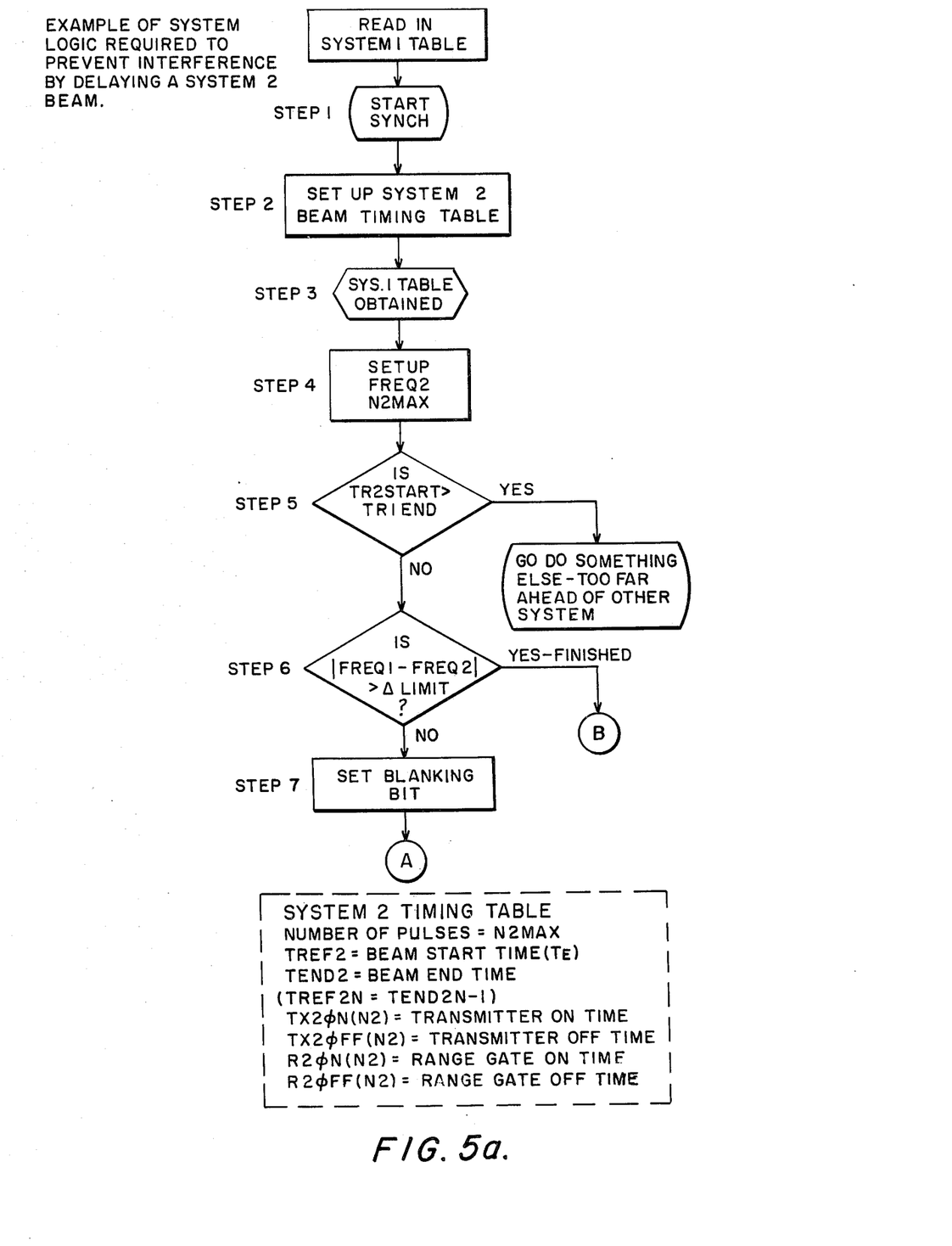
FIG. 5a and 5b are flowcharts of possible programmed embodiments.
Figure 5B:
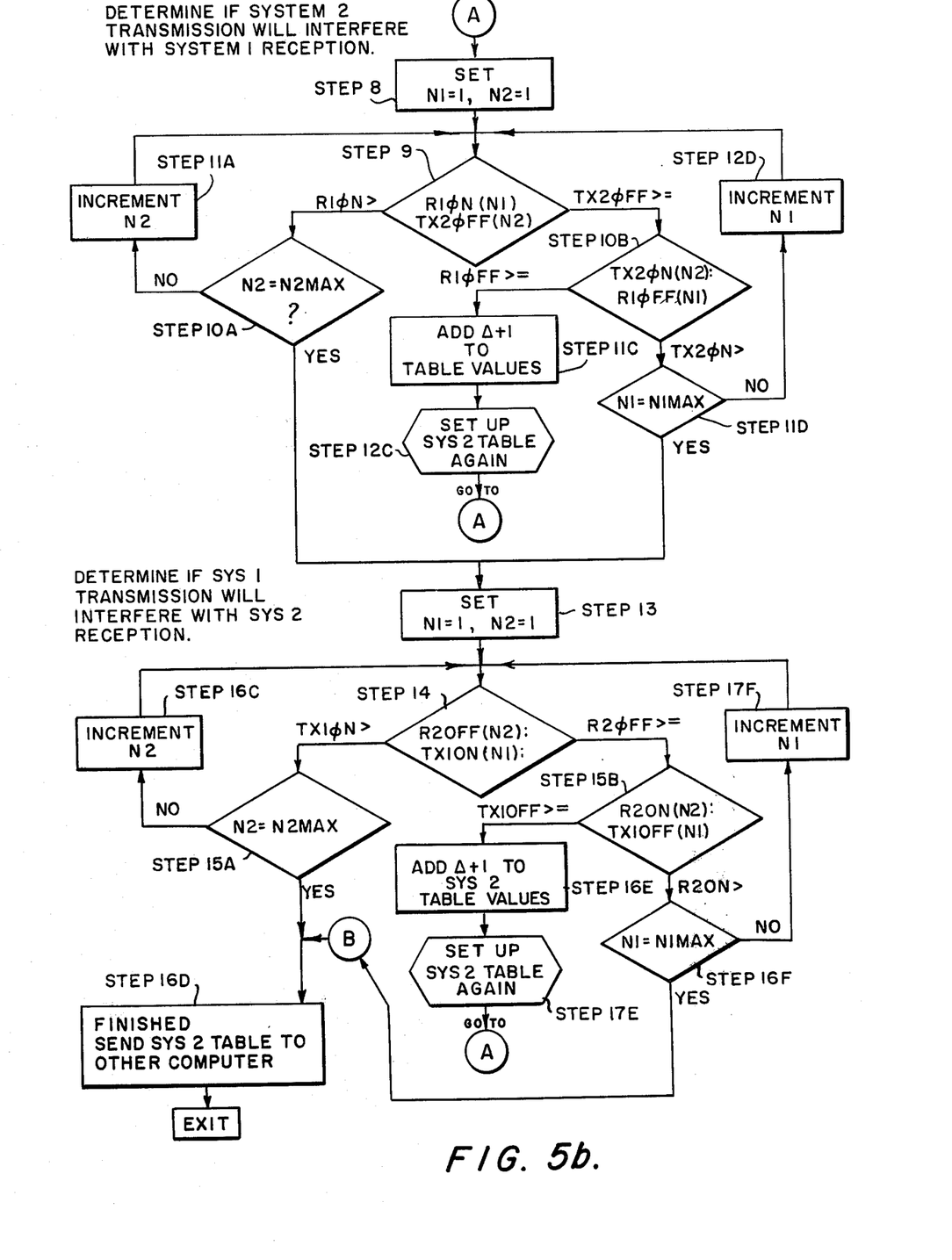

One flow-chart for the system B computer program to implement the time delay insertion of FIG. 4 is shown in FIGS. 5a and 5b. In order to facilitate the ease with which this program flowchart may be read various abbreviations are used. All references to system A are changed to system 1 and all references to system B are changed to system 2 in order to clearly delineate between the letters used in the abbreviations and the system designations. The program operates as follows:

INITIAL CONDITIONS: The table of values for system 1 has been read into computer 2.
Step 1: The program is activated.

2: The system 2 Beam-Timing table is set up and This table for system 2 consists of:
 a. Total number of pulses in the beam fired per transmit command from the computer = N 2 Max
 b. Start time of the transmission of pulses from transmitter 2 = TR-2-START
 c. END time of the transmission of pulses from transmitter 2 = TR-2-END
 c. Transmitter 2 turn-on time to send pulse (hit) number N in system 2 = T-32-ON (N2)
 e. Transmitter turn-off time after sending pulse number N in system 2 = T-2-OFF (N2)
 f. Range gate turn-on time to receive the echo from pulse number N in system 2 = R-2-ON (N2)
 g. Range gate turn-off time for echo from pulse N in system 2 = R-2-OFF (N2)

These values were computed elsewhere and are merely read into the computer.

Step 3: Table of values from other system is obtained and read into the computer.

Step 4: The pulse transmission frequency or time between pulses in a transmission beam is read into the computer.

Step 5: The computer tests whether the transmission beam start time of system 2 TR-2-START is greater than the transmission beam end time of system 1 TR-1-END.

YES: If TR-2-START>TR-1-END then go do something else since system 1 is too far ahead of system 2 to determine if interference would occur.

NO: If TR-2-START ≤ TR-1-END then go to step 6.

Step 6: Is the absolute value of the difference between frequency of pulses in the transmission beam of system 2 and the frequency of pulses in transmission beam of system 1 greater than some predetermined number ΔLIMIT. This limit is set such that the whole transmission of one system may fall between 2 pulses of the other system.

YES: Then there can be no interference because one system transmission falls between pulses of the other system. Thus go to point B.

NO: Go to step 7.

Step 7: Set the blanking bit so that the limiters blank all signal reception at their respective receivers.

Step 8: Set N1 = 1, N 2 = 1 where N1 equals the pulse N in system 1 and N2 equals the pulse N in system 2.

Step 9: Compare the range gate turn-on time to receive the echo from system 1 pulse N with the system 2 transmitter turn-off time after sending system 2 pulse N.

If R1-ON (N1) >TX-2-OFF (N2) then go to step 10A. There is no overlap here between the transmission of system 2 pulse N and the reception in system 1 of pulse N1. Thus it is desired to test the next pulse of the system 2 transmission to see if it interferes with system 1 reception.

Step 10A: Determine whether the system 2 transmission pulse just tested for interference N2 is the last pulse in the transmission.

YES: Then go to step 13 to determine if system 1 transmission will interfere will system 2 reception.

NO: Go to step 11A to increment the pulse index number.

Step 11A: INCREMENT index number N2 by 1 and go to step 9.

If in Step 9 TX-2-OFF-(N2) ≥ R1-ON-(N1) then there might be interference betweenn the system 2 transmission and system 1 reception. Go to step 10B.

Step 10B. Compare the system 2 transmitter turn-off time for pulse N2 with the range gate turn-on time to receive the echo from pulse N1.

If R1 OFF (N1) ≥ TX 2 on (N2) then there is defintely interference between the pulse N2 transmission and the reception of pulse N1 since TX-2-OFF-(N2) has been determined to be less than R1 OFF (N1) but greater than or equal to R1-ON-(N1). Go to step 11C Step 11C: Add a time delay Δ + 1 to every number held in the system 2 table of values except N2 MAX. This time delay is merely the time required to be added to move the interfering system 2 transmission pulse ahead of system 1 range gate interfered-with. Step 12C: Set-up the system 2 table of values again.

Now the pulse no longer interferes with that particular range-gate. Go back to point A and start over to determined whether in this new time position, any of the other transmission pulses now, interfere with a range gate.

If in step 10B TX-2-ON-(N2)>RI-OFF-(N1)

then there is no interference and system 2 transmission pulse N2 step 11D.

Step 11D: Is the range gate Nl equal to the last range gate in system 1 N1-MAX.

YES: Then go to step 13 to determine whether there is interference between the transmission of system 1 and the reception of system 2.

NO: Then go to step 12D to add one to the range gate index to compare the transmission pulse N2 with the next range gate.

Step 12D: INCREMENT: the range gate index N1 by 1 and go to step g. Note: The next set of steps is almost identical to the set just discussed.

Step 13: To determine if the system 1 transmission will interfere will the system 2 reception. Set the pulse index equal to one. Go to step 14

Step 14: Compare R2-OFF-(N2) to TX-1-ON-(N1).

If TX-1-ON-(N1) is greater than R2-OFF-(N2)

then there is no interference. Go to step 15A

Step 15A: Does pulse index N2 equal the last pulse range gate in system 2, N2-MAX.

YES: Go to step 16D. The program is finished.

NO: INCREMENT the system 2 pulse index N2 by one and go to step 14.

If in step 14 R2-OFF-(N2) ≥ TX 1 ON (N1) then there might be interference. Go to step 15B.

Step 15B: Compare R-2-ON-(N2) to TX-1-OFF-(N1).

If TX-1-OFF-(N1)>R2-ON-(N2) then there is definitely interference since R2-OFF-(N2) is greater than TX-1-ON-(N1) and TX-1-OFF-(N1) is greater than R2-ON-(N2). Go to step 16E Step 16E: Add a time delay Δ + 1 to every number held in the system 2 table of values except N2-MAX. This time delay is merely the time required to be added on to these values in order to move this system 2 range-gate ahead of the interfering pulse from system 1..

Go to step 17E..

Step 17E: Set up the system 2 table of values. Go back to point A and retest all the system 2 range-gates to determine whether there is any interference in their new time position.

If in step 15B R2-ON-(N2)>TX1-OFF-(N1)

then there is no interference. Go to step 16F.

Step 16F: Is the pulse index N1 equal to the last pulse in the system 1 transmission, N1-MAX.

YES: Then the program is finished. Go to point B.

NO: Go to step 17F.

Step 17F: INCREMENT the pulse index N1 by 1 and go to step 14 to determine if the next transmission pulse of system 1 interferes with the system 2 range gate for N2.

Step 16D: The program is finished. Send the system 2 table of values to the other computer.

The other computer will now run through the same program but with the system numbers reversed.

This program thus requires a large number of iterations in order to time multiplex these two sets of system pulses and range-gates so that there is no interference. This system thus provides the optimum time allotment or time efficiency possible because one system is shifted only slightly to provide a perfect intertwining of the systems.

This optimum efficiency program can be used on the AN/UYK-7 Univac computer. This computer has the advantage of being fast enough to handle the large number of iterations required by this program.

Figure 6:
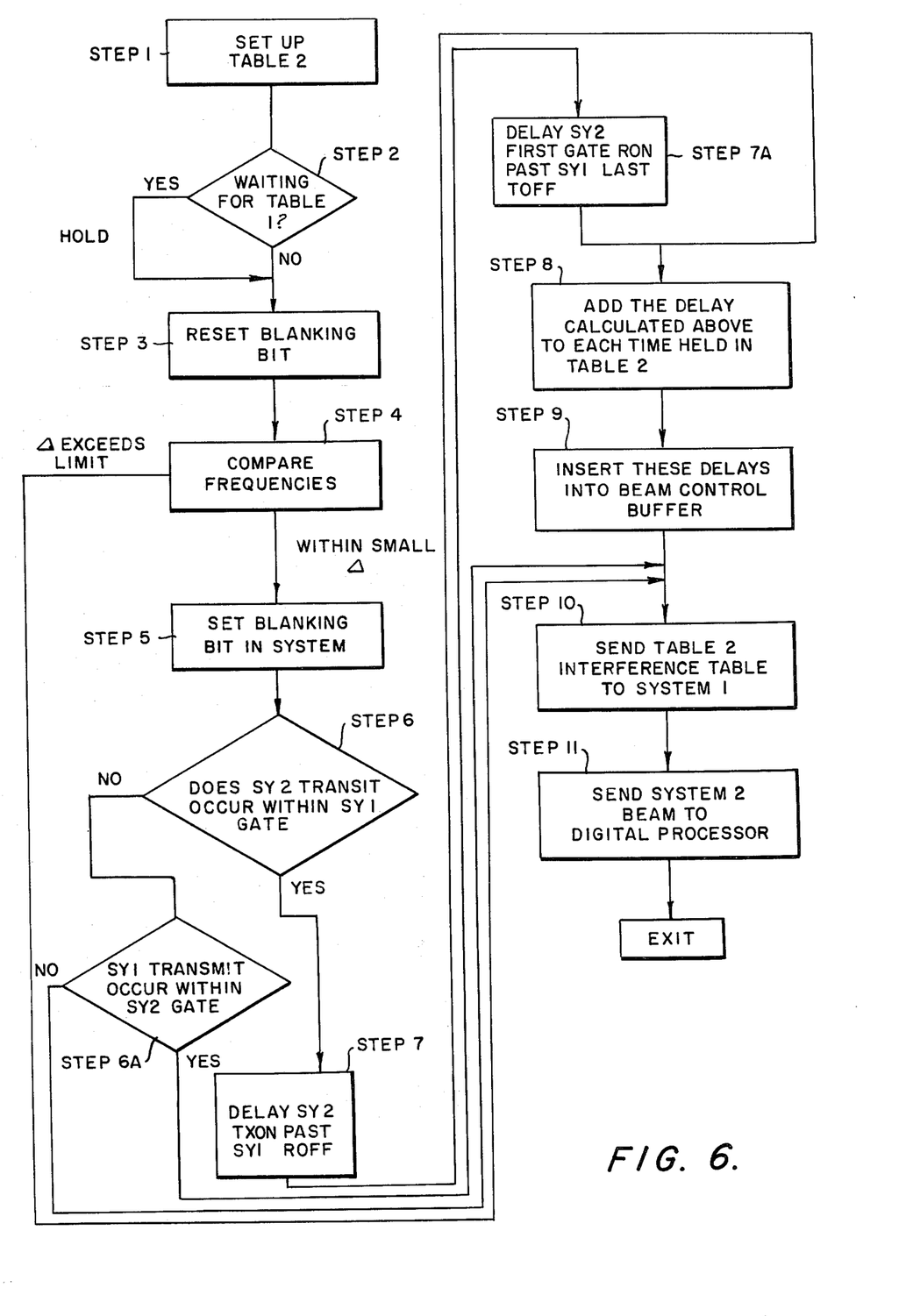
FIG. 6 is a flowchart for a second possible programmed embodiment of the present invention.

A second programmed embodiment that could be used to calculate required time delays is shown in FIG. 6.

Step 1 sets up the interference table for the next beam that is to go to the radar digital processor.

Step 2 determines whether system 2 is waiting for system 1 to send over its interference table.

YES: Then wait till this table is received.

NO: Then go directly to step 3 and compare the interference tables.

Step 3 changes the blanking bit flipflop to reset so that there is no blanking.

Step 4 compares the transmission frequencies of the two systems and determines whether they are within a predetermined limit.

Without the limit: Go to step 10

Within the Limit: Go to step 5

Step 5 sets the blanking bit since the frequencies are close enough to cause interference at the PPI console.

Step 6 determines whether the system 2 transmit time overlaps the system 1 range gate and will thus cause interference. (Compares end oF system 1 beam time (R-OFF) with the beginning (Ton) of system 2 beam time).

YES ST2-R off>SY1-TON, then go to step 7
NO: SY1-TON>SY2-ROFF, then go to step 6A.

Step 6A determines whether the system 1 transmit time overlaps the system 2 range gate. (Compares Ton of system 1 with R OFF of system 2).

YES: Go to step 7A
NO: Go to step 10

Step 7A calculates a delay for system 2 such that its first gate opens beyond the last transmission (T-OFF) of system 1.

Step 7, if step 6 is yes, then calculate a delay for system 2 in order to start its transmission (T-ON past the last system 1 range gate (R-OFF).

Step 8 adds the delay calculated in either of steps 7 or 7A to each time held in table 2.

Step 9 inserts these delays into the beam control buffer.

Step 10 sends the interference table of system 2 to system 1.

Step 11 sends the system 2 beam to its digital processor.

This program, although it does not provide the most efficient time allotment schedule, requires the last number of iterations and thus is very fast. Such a program could be used in a less expensive computer such as the UNIVAC 1,230.

Obviously, many modifications and variations of the present invention are possible in light of the above teachings. It is therefore to be understood that, within the scope of the appended claims, the invention may be practiced otherwise than as specifically described.

What is claimed is:

1. A method to eliminate mutual interference between two radar systems each system containing a digital processor comprising the steps of:
   a. monitoring by each system of the present and future transmission and reception activity of the other system;
   b. slaving the digital processor of each system to the same master clock;
   c. synchronizing periodically the operation of the digital processors to a reference signal;
   d. when a system desires to transmit a radar beam, comparing its transmission frequency with the transmission frequency of the other system;
   e. determining whether the difference between these two frequencies is less than some predetermined number;
   f. if these systems are in a search-beam mode and if this difference is less than this predetermined number, blanking the receivers of both systems;
   g. if these systems are in a tracking-mode and if this difference is less than the predetermined number, determining whether the transmit and range-gate time of this system will overlap the transmit and range-gate time of the other system;
   h. if the overlap will occur, determining a time delay so that there will be no overlap of a transmission with a range-gate;
   i. inserting this time delay into the timing table of the beam to be transmitted from this system.

2. A method to eliminate mutual interference between two radar systems, each of said systems containing a digital processor, comprising the steps of:
   a. monitoring by each system of the present and future transmission and reception activity of the other system;
   b. slaving the digital processor of each system to the same master clock;
   c. synchronizing periodically the operation of the digital processors to a reference signal;
   d. when a system desires to transmit a radar beam, comparing its transmission frequency with the transmission frequency of the other system;
   e. determining whether the difference between these two frequencies is less than some predetermined number;
   f. if these systems are in a search-beam mode and if this difference is less than this predetermined number, blanking the receivers of both systems;
   g. if these systems are in a tracking-mode and if this difference is less than the predetermined number, determining whether the transmit and range-gate time of this system will overlap the transmit and range-gate time of the other system;
   h. if the overlap will occur, determining a time delay such that the beginning of the one system's interfering transmission is shifted completely in time past the end of the last range-gate of the interfered-with reception period of the other system; and
   i. inserting this time delay into the timing table of the beam to be transmitted from this system.

3. A method to eliminate mutual interference between two radar systems, each of said systems containing a digital processor, comprising the steps of:
   a. monitoring by each system of the present and future transmission and reception activity of the other system;
   b. slaving the digital processor of each system to the same master clock;
   c. synchronizing periodically the operation of the digital processors to a reference signal;
   d. when a system desires to transmit a radar beam, comparing its transmission frequency with the transmission frequency of the other system;
   e. determining whether the difference between these two frequencies is less than some predetermined number;
   f. if these systems are in a search-beam mode and if this difference is less than this predetermined number, blanking the receivers of both systems;
   g. if these system are in a tracking-mode and if this difference is less than the predetermined number, determining whether the transmit and range-gate time of this system will overlap the transmit and range-gate time of the other system;
   h. if the overlap will occur, determining a time delay such that the start of the one system's range-gates is shifted completely in time past the end of the last pulse of the interfering transmission of the other system; and
   i. inserting this time delay into the timing table of the beam to be transmitted from this system.

4. A method to eliminate mutual interference between two radar systems, each of said systems containing a digital processor and wherein each system transmission comprises a set of pulses and each system reception period comprises a set of range-gates comprising the steps of:

a. monitoring by each system of the present and future transmission and reception activity of the other system;
b. slaving the digital processor of each system to the same master clock;
c. synchronizing periodically the operation of the digital processors to a reference signal;
d. when a system desires to transmit a radar beam comparing its transmission frequency with the transmission frequency of the other system;
e. determining whether the difference between these two frequencies is less than some predetermined number;
f. if these systems are in a search-beam mode and if this difference is less than this predetermined number, blanking the receivers of both systems;
g. if these systems are in a tracking-mode and if this difference is less than the predetermined number, determining whether the transmit and range-gate time of this system will overlap the transmit and range-gate time of the other system;
h. if the overlap will occur, determining a time delay such that the set of pulses comprising the interfering transmission for the one system is intertwined in time with no overlap with the set of range gates comprising the interfered-with reception period of the other system; and
i. inserting this time delay into the timing table of the beam to be transmitted from this system.

* * * * *